US008347222B2

(12) United States Patent
Raguseo

(10) Patent No.: US 8,347,222 B2
(45) Date of Patent: Jan. 1, 2013

(54) FACILITATING AUTO-COMPLETION OF WORDS INPUT TO A COMPUTER

(75) Inventor: Domenico Raguseo, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1052 days.

(21) Appl. No.: 11/765,534

(22) Filed: Jun. 20, 2007

(65) Prior Publication Data

US 2007/0296615 A1  Dec. 27, 2007

(30) Foreign Application Priority Data

Jun. 23, 2006  (EP) .................................... 06115990

(51) Int. Cl.
*G06F 3/048* (2006.01)
(52) U.S. Cl. ........................................ 715/780; 715/816
(58) Field of Classification Search .................. 715/780, 715/816, 261, 533
See application file for complete search history.

(56) References Cited

U.S. PATENT DOCUMENTS

| 7,890,526 B1* | 2/2011 | Brewer et al. ................. 707/767 |
| 2002/0129012 A1* | 9/2002 | Green ............................... 707/3 |
| 2005/0062619 A1* | 3/2005 | Jellicoe ........................... 341/22 |
| 2007/0037613 A1* | 2/2007 | Kim .......................... 455/575.1 |
| 2007/0046641 A1* | 3/2007 | Lim ............................... 345/173 |

\* cited by examiner

*Primary Examiner* — Rashawn Tillery
(74) *Attorney, Agent, or Firm* — Lee Law, PLLC; Christopher B. Lee

(57) ABSTRACT

A solution (600*b*) for auto-completing words being input to a computer is proposed. For this purpose, a user starts inputting (656;677) a prefix of a target word; the computer tries predicting the target word that is desired, and it completes (680) the prefix automatically (without the need of inputting the entire target word). In the proposed solution, the user also inputs (659-662,665) an indication of the length of the target word. In this way, the computer can restrict (668) the words being eligible to complete the prefix (i.e., including it) only to the ones having the desired length. This allows solving any ambiguity with shorter prefixes.

18 Claims, 8 Drawing Sheets

FACILITATING AUTO-COMPLETION OF WORDS INPUT TO A COMPUTER

FIELD OF THE INVENTION

The present invention relates to the information technology field. More specifically, the invention relates to an auto-complete facility of a data processing system.

BACKGROUND ART OF THE INVENTION

Data processing systems (such as computers) generally interact with users by requiring input data and by returning corresponding output results. For this purposes several types of user interfaces are available; for example, a Graphical User Interface (GUI) provides stylized elements (such as input boxes, command buttons, and the like), which are aimed at facilitating the inputting of the required data and the outputting of the desired results.

In this context, a critical task is the entering of data in the form of text. Indeed, many applications require the inputting of very lengthy texts (such as in word-processors); other applications instead require the inputting of difficult texts (such as web addresses in browsers used to access the Internet). In any case, the operation of inputting the desired text may be very time consuming; moreover, the same operation is prone to frequent errors.

Some speech-recognition solutions are available to transform the human voice into a sequence of words, which are automatically input to the computer. However, the overwhelming majority of users still use conventional input devices to interact with the computer. Particularly, the texts are commonly input by means of a keyboard. The keyboard consists of a set of keys, which must be pressed to enter corresponding symbols (such as characters). In order to input a desired text (such as a word), the user must type in succession all its characters. This may be a problem when the word is long and/or difficult to spell correctly.

A solution known in the art for facilitating the input of words is the auto-complete technique, which is supported by many software programs (such as word-processors and web browsers). In this case, for each word the user only inputs its first characters (or prefix). The auto-complete facility then tries predicting the actual word that is desired, and it completes the prefix automatically (without the need of inputting the entire word). For example, a type of auto-complete facility known in the art involves displaying a pop-up list of all the possible words that are eligible to complete the prefix, in order to allow the user to select the correct one. Another available approach instead requires continuing typing the characters of the prefix until a single eligible word is found corresponding thereto. The auto-complete facility speeds up the input of text, and strongly reduces the risk of typing errors.

Nevertheless, the solutions known in the art are not completely satisfactory. Indeed, a huge number of eligible words are commonly available for short prefixes (consisting of only a few characters); therefore, a relatively long prefix must be entered before the eligible words reduce to a manageable set (which is practical for their selection). Likewise, it might be necessary to type many characters of the desired word to resolve any ambiguity for the automatic completion of the corresponding prefix.

For example, let us assume that the user starts typing the letter "H"; hundreds of words beginning with this letter exit (from "HABEAS" to "HYSTERICS"), so that no meaningful information can be provided by the auto-complete facility. If the user continues typing the letter "U", the choice restricts to less eligible words (from "HUB" to "HUZZY"), which are however still too many for taking any decision. Therefore, the process must be reiterated until the required information is obtained; however, this involves typing a number of characters that might be close to the entire desired word. For example, 13 characters are required before being able to identify the word "HUMANITARIANISM" univocally (from the prefix "HUMANITARIANI").

The above-mentioned drawbacks are particular acute in applications working with a large lexicons wherein a very high number of words can be used (such as word-processors, e-mail clients and SMS editors). Indeed, in this case it is very difficult to predict the word that is being input, because of the huge number of eligible words corresponding to every prefix.

SUMMARY OF THE INVENTION

In its general terms, the present invention is based on the idea of limiting the eligible words according to an expected length thereof.

Particularly, the present invention provides a solution as set out in the independent claims. Advantageous embodiments of the invention are described in the dependent claims.

More specifically, an aspect of the invention proposes a method for assisting a user to input strings (such as words) in a data processing system; each string consisting of a sequence of symbols (such as characters) having a corresponding length. For each target string to be input the method includes the following steps. At first a sub-sequence of the symbols of the target string (such as its prefix) is provided; an indication of a target length of the target string is also provided. The method continues by associating a set of eligible strings of a predefined vocabulary to the sub-sequence; each eligible string includes the sub-sequence and has a length corresponding to the target length. The user is then enabled to select the eligible strings for completing the sub-sequence.

In a preferred embodiment of the invention, the target length is defined by a selection time of one or more of the characters of the sub-sequence.

For example, the selection time of each character consists of a pressing time of a corresponding key.

In a proposed implementation, the target length is defined by the selection time of a last character of the sub-sequence; in this case, all the eligible words are displayed for their selection by the user.

As a further improvement, the target length can be updated (such as increased and/or decreased) in response to a corresponding command.

In a different implementation, the target length is defined by the selection time of a first character of the sub-sequence, in this case, the sub-sequence is completed automatically as soon as a single eligible word is found.

Typically, the eligible words start with the sub-sequence and have the target length.

Alternatively, the eligible words also include the ones that are preceded by one or more combinations of further characters.

Advantageously, these combinations consist of each mute character of a relevant alphabet (such as the letter "H").

Another aspect of the invention proposes a computer program for performing the method.

A further aspect of the invention proposes a corresponding system.

BRIEF DESCRIPTION OF THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1:
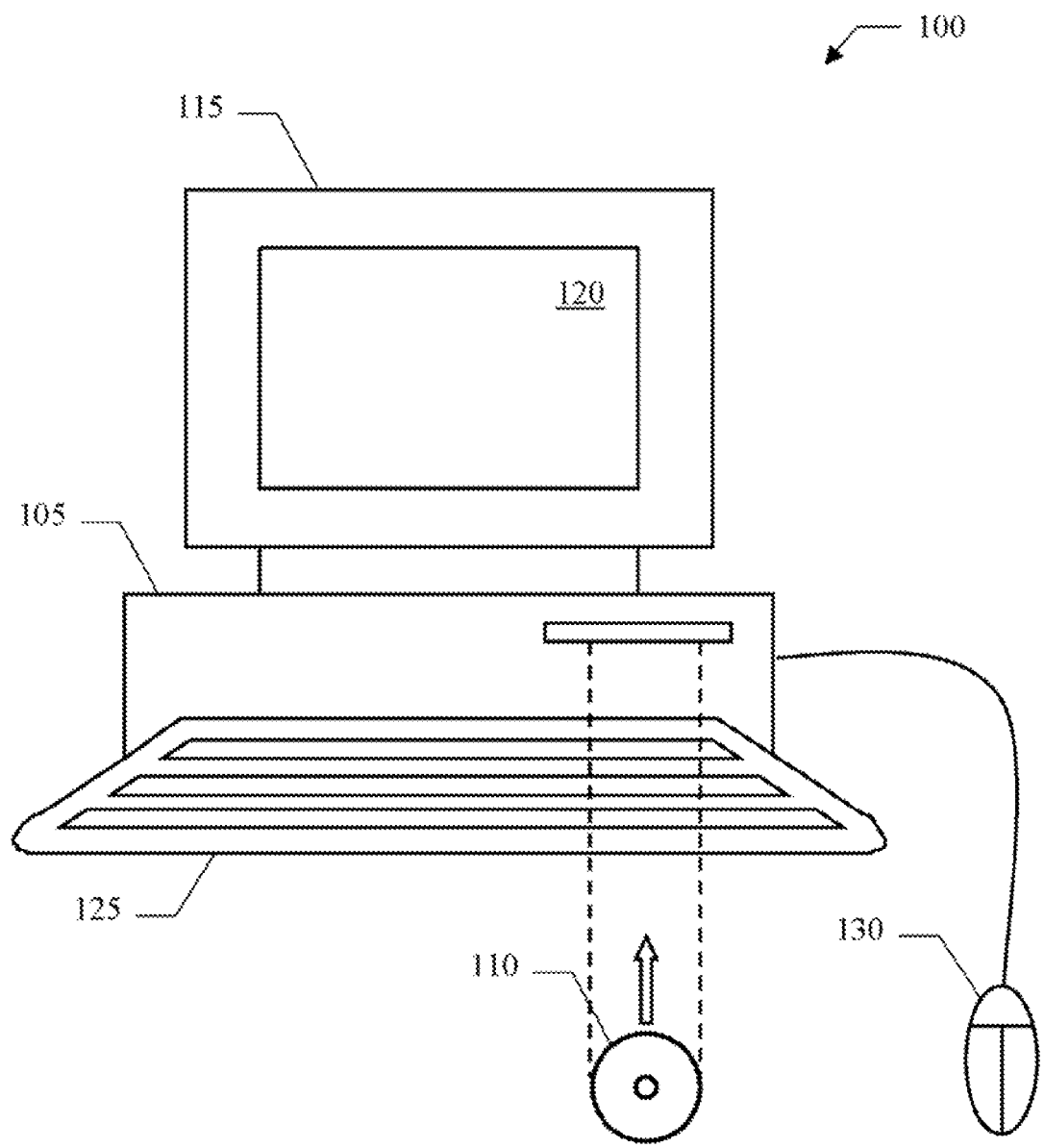
FIG. 1 is a pictorial representation of a computer in which the solution according to an embodiment of the invention is applicable.

With reference in particular to FIG. 1, a computer 100 (for example, a PC) is illustrated. The computer 100 includes a central unit 105, which houses the electronic circuits controlling its operation (such as a microprocessor and a working memory). The computer 100 is also provided with a hard-disk and a drive for reading CD-ROMs 110. A monitor 115 is used to display images on a screen 120. Operation of the computer 100 is controlled by means of a keyboard 125 and a mouse 130, which are connected to the central unit 105 in a conventional manner.

Figure 2A:
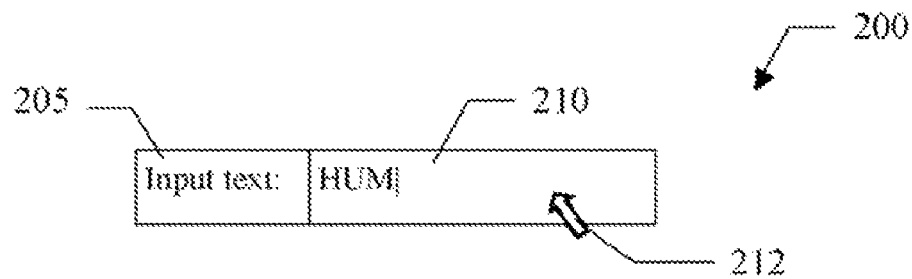
FIGS. 2a-2e, 3a-3c and 4a-4b illustrate exemplary applications of the solution according to different embodiments of the invention.

As shown in FIG. 2a, the computer is provided with a GUI 200 (which is implemented on its screen). In the specific scenario at issue, a text box 205 displays an expression ("Input text:") prompting a user of the computer to input a required text; the text consists of one or more words, each one formed by a string of characters—selected from a predefined alphabet. For this purpose, an input box 210 is arranged beside the text box 205. The user selects the input box 210 (for example, by moving a pointer 212 over it and then clicking with the mouse); the user can then start typing the desired characters, which are echoed on the input box 210—with a current position of a cursor within the input box 210 (indicating its area being edited), which is commonly identified by a blinking vertical line (caret).

The GUI 200 also supports an auto-complete facility, which is aimed at predicting any target word being input from a starting subset of its characters (prefix), so as to complete it automatically—without the need of inputting the entire target word. For this purpose, the auto-complete facility identifies any word of a predefined vocabulary that is eligible to complete the prefix (i.e., including it); for example, the vocabulary consists of a list of words that are known in a specific language (such as English). When multiple eligible words are available, the user selects the desired one manually; otherwise, the prefix is directly completed when a single eligible word is found.

In the solution according to an embodiment of the present invention, as described in detail in the following, the eligible words are further identified according to an expected length of the target word (for example, provided by a pressing time of the keys corresponding to the characters of the prefix). Therefore, the eligible words are only chosen among the ones in the vocabulary having a length corresponding to the desired (target) length.

As a result, the number of eligible words is strongly reduced (since all the other—i.e., shorter or longer—words in the vocabulary including the same prefix are discarded). This allows obtaining a manageable set of eligible words (being practical for selecting the desired one) with a relatively short prefix; likewise, it is possible to resolve any ambiguity for the automatic completion of the prefix after typing a lower number of characters of the target word.

The proposed technique facilitates the input of text, especially when it includes words that are very long and/or difficult to spell correctly.

The above-mentioned advantages are clearly perceived in applications working with a large lexicon (such as word-processors, e-mail clients and SMS editors). Indeed, in this case it is possible to reduce the high number of eligible words corresponding to every prefix.

For example, let us assume that the user inputs the prefix "HUM", by typing in succession the characters "H", "U" and "M" in the input box 210. The key of the last character "M" is maintained pressed for a time corresponding to the desired target length (for example, by counting 1 character every 0.5 s of pressing time). This modality of inputting the target length is very intuitive (for example, being implemented by the user mentally repeating the characters required to complete the prefix).

Figure 2B:
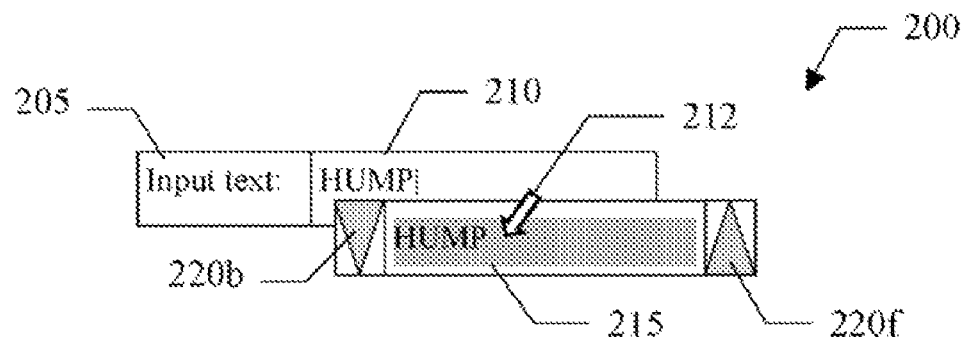

Moving to FIG. 2b, as soon as the user pauses for more than a predefined time-out (without inputting any further character) a pop-up window 215 is opened beside the input box 210. The pop-up window 215 lists all the eligible words corresponding to the prefix in the input box 210 (i.e., starting with the prefix and having the target length). The pop-up window 215 is also provided with a backward button 220b (on the left) and a forward button 220f (on the right); the backward button 220b and the forward button 220f are used to decrease and to increases, respectively, the target length previously input.

For example, assuming that the target length is 4 characters (i.e., the pressing time of the key of the character "M" was 0.5×4=2 s), the pop-up window 215 lists all the eligible words of 4 characters starting with the prefix "HUM" (in this case consisting of the single eligible word "HUMP"). The user can select this eligible word, by moving the pointer 212 over it and then clicking with the mouse; the selected eligible word (indicated by shading its background in the figure) is then used to complete the prefix in the input box 210 automatically.

Conversely, the user can decide to increase the target length (for example, because the pressing time of the key of the character "M" was too short). For this purpose, the user moves the pointer 212 over the forward button 220f and then clicks with the mouse. As a result, a unit is added to the target length (i.e., 4+1=5).

Figure 2C:
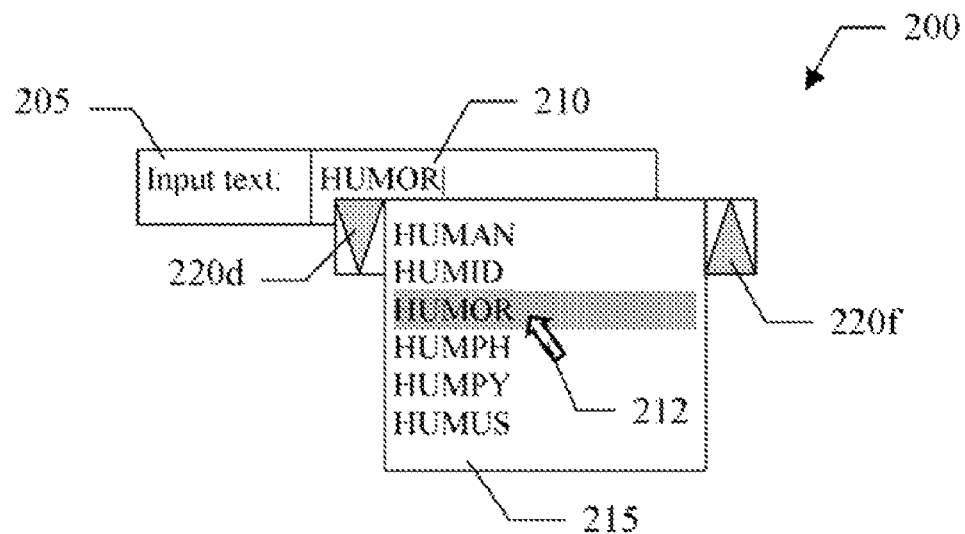

As shown in FIG. 2c, the pop-up window 215 now lists all the eligible words of 5 characters starting with the prefix "HUM" (i.e., "HUMAN", "HUMID", "HUMOR", "HUMPH", "HUMPY", and "HUMUS"). Of course, the same result would have been obtained directly if the key of the character "M" was originally maintained pressed for a longer time (i.e., 0.5·5=2.5 s). As above, the user can select one of the eligible words by clicking over it (such as the eligible word "HUMOR" with the shaded background in the figure); the selected eligible word is then used to complete the prefix in the input box 210 automatically.

Figure 2D:
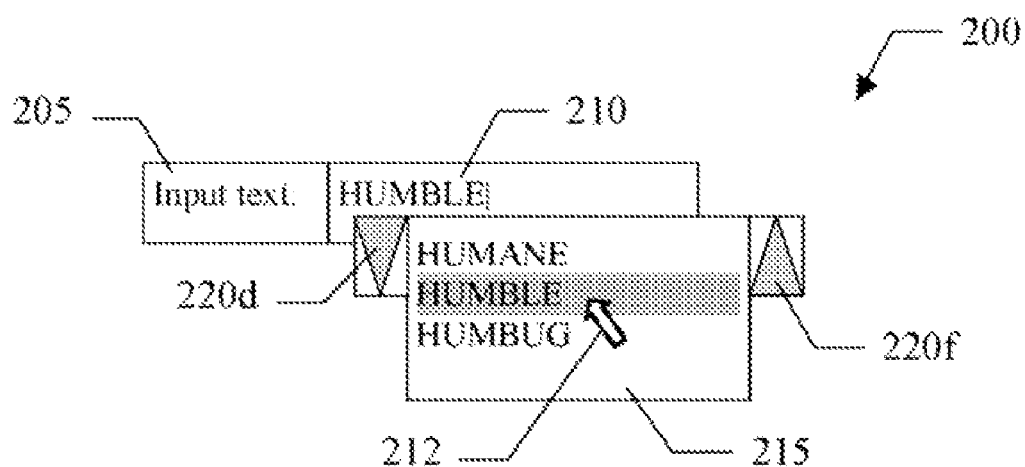

Likewise, FIG. 2d shows the situation wherein the target length is 6 characters (because either the pressing time of the key of the character "M" was 0.5×6=3 s or the user clicked on the forward button 220f once again). The pop-up window 215 now lists all the eligible words of 6 characters including the prefix "HUM" (i.e., "HUMANE", "HUMBLE", and "HUMBUG"), with the eligible word "HUMBLE" that is selected to complete the prefix in the input box 210.

Figure 2E:
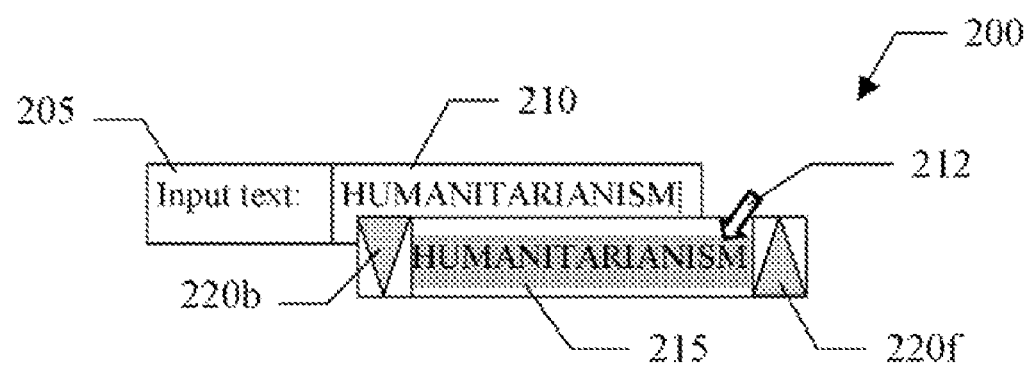

Continuing by this (see FIG. 2e), when the target length is 15 characters (pressing time 0.5×15=7.5 s), the pop-up window 215 lists the eligible words of 15 characters including the prefix "HUM" (consisting of the single eligible word "HUMANITARIANISM"), which is then selected to complete the prefix in the input box 210.

It would be appreciated that a manageable number of eligible words is obtained (for their display in the pop-up window 215) in any situation, even if the prefix is relatively short. For example, in the scenario at issue the eligible words always remain of the order of a few units; this result is achieved irrespectively of the fact that the prefix "HUM" only consists of 3 characters.

Figure 3A:
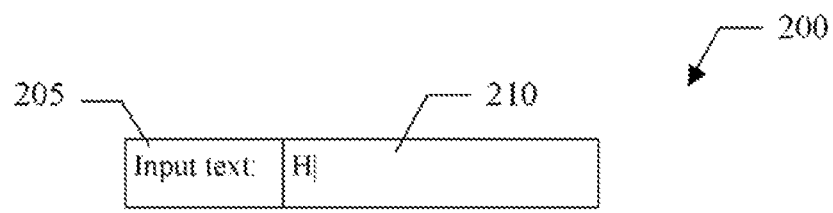
Figure 3A:
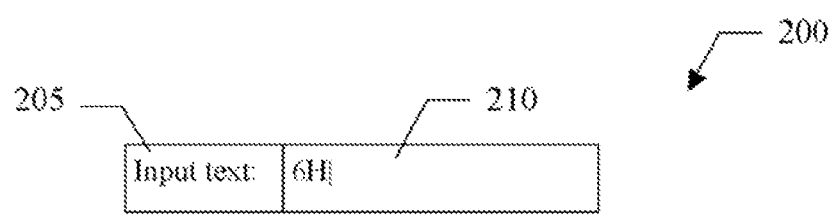

With reference now to FIG. 3a, in a different embodiment of the invention the desired target length is defined by the pressing time of the key corresponding to the first character typed in the input box 210. For example, the user can indicate that the target length is 6 characters (for the target word "HUMANE") by maintaining the key of the first character of this target word (i.e., "H") pressed for 0.5×6=3 s. As above, this modality of inputting the target length is very intuitive (with the possibility of implementing it by mentally repeating the characters of the target word).

Alternatively, as shown in FIG. 3a', the same result can be achieved by typing the number of characters of the target length directly (i.e., 6) before the first character "H" of the target word in the input box 210. This allows providing the target length exactly, without any inaccuracy due to the difficulty of calculating the corresponding pressing time precisely (even if this makes the input operation less direct).

Figure 3B:
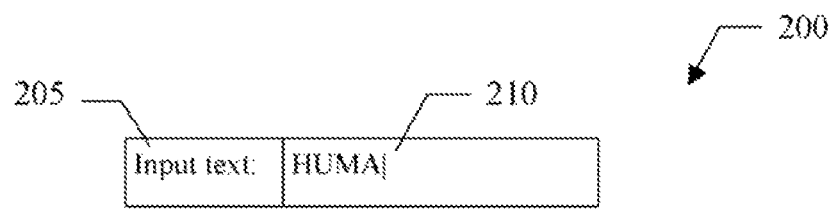

Passing to FIG. 3b, in both cases the user then continues typing in succession the next characters of the target word in the input box 210 (i.e., "U", "M" and "A"). For each character that is typed (starting from the first one), the auto-complete facility determines the number of eligible words of 6 characters including the prefix currently input (i.e., "H", "HU", "HUM" and "HUMA", respectively). As soon the number of eligible words reduces to 1 (meaning that a single eligible word has been found), the prefix is automatically completed into this eligible word—being then accepted by the user typing a space for inputting a next word. In the example at issue, this happens when the prefix is "HUMA", so as to obtain the desired target word "HUMANA" (see FIG. 3c).

It should be noted that any ambiguity (for determining the correct target word) can now by resolved by typing a relatively low number of characters of the prefix. For example, only 2 characters (together with the indication of the target length of 15) are now required to auto-complete the target word "HUMANITARIANISM" from the prefix "HU" (instead of the 13 characters that would have been required by the solutions known in the art).

Figure 4A:
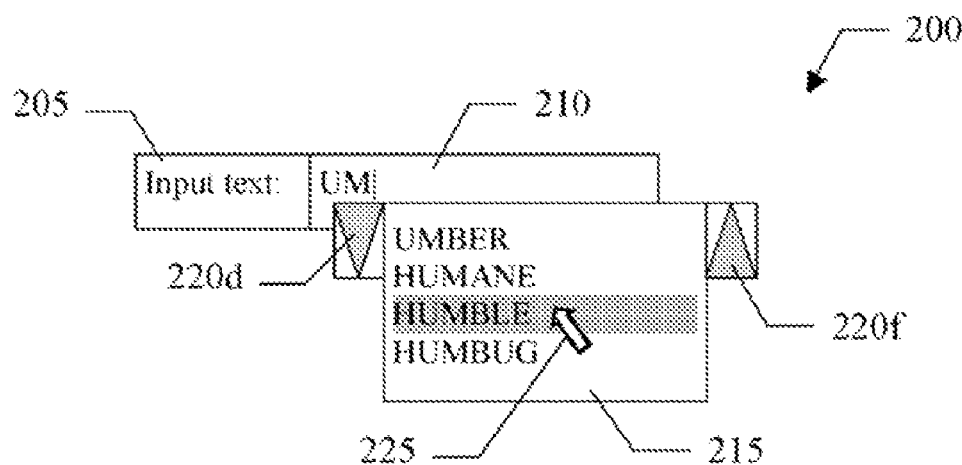
Figure 4B:
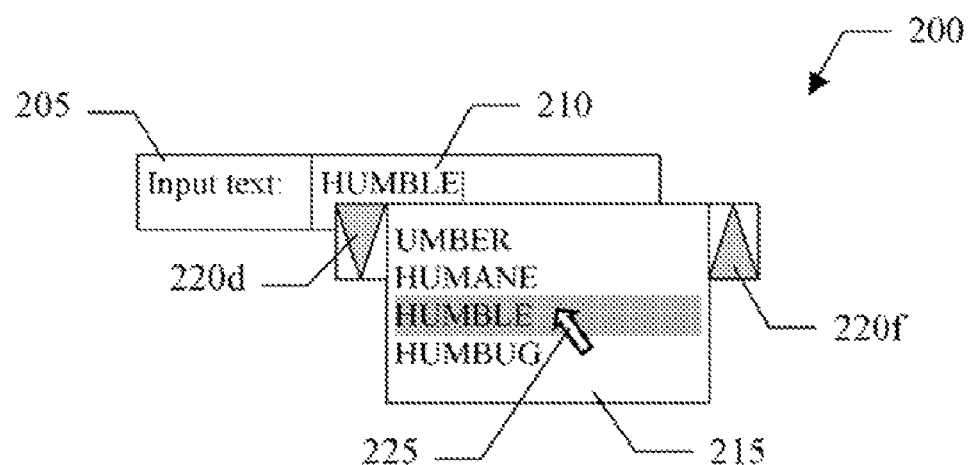

A way to further improve the solution is illustrated in FIGS. 4a-4b. In this case, the eligible words further include the words of the vocabulary starting with the letter "H" followed by the prefix, and which have the target length plus 1 (in addition to the above-mentioned words of the vocabulary starting with the prefix and having the target length). For example, as show in FIG. 4a, let us assume that the user inputs the prefix "UM", by maintaining the key of the last character "M" pressed for 2.5 s (to indicate a target length of 2.5 s/0.5 s=5 characters). Therefore, the pop-up window 215 will list the eligible words of 5 characters starting with the prefix "UM" (i.e. "UMBER") and the eligible words of 5+1=6 characters starting with the prefix "H"+"UM"="HUM" (i.e., "HUMANE", "HUMBLE", and "HUMBUG"). As above, the user can select one of the eligible words by clicking over it (such as the eligible word "HUMBLE"); this selected eligible word is then used to complete the prefix in the input box 210 automatically—by adding the character "H" at the beginning and the characters "BLE" at the end in this case—as shown in FIG. 4b.

This additional feature helps inputting words, which first characters are not easy to spell correctly. Particularly, the proposed feature is very useful when the target word starts with a mute letter (such as "H" in English). Indeed, the auto-complete facility now suggests the desired target word even if the user starts typing it incorrectly without the mute letter "H". This advantage is clearly perceived when the user is inputting words in a foreign language.

Figure 5:
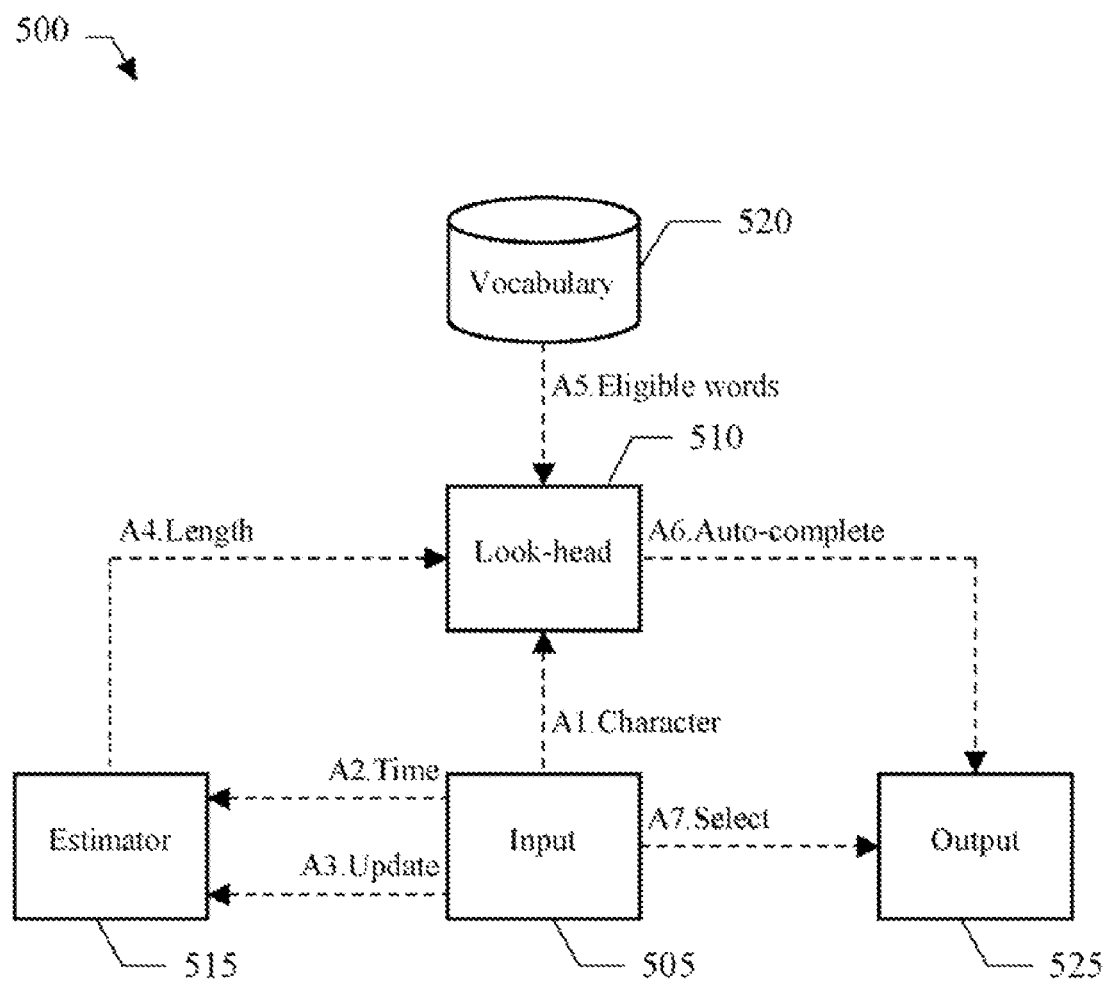
FIG. 5 is a collaboration diagram representing the roles of different software modules implementing the solution according to an embodiment of the invention.

With reference to FIG. 5, the main software modules that may be used to implement the above-described auto-complete facility are denoted as a whole with the reference 500. The information (programs and data) is typically stored on the hard-disk and loaded (at least partially) into the working memory of the computer when the programs are running. The programs are initially installed onto the hard disk, for example, from COD-ROM. Particularly, the figure describes the static structure of the system (by means of the corresponding modules) and its dynamic behavior (by means of a series of exchanged messages that are denoted with progressive sequence numbers preceded by the symbol "A").

Particularly, an input drive 505 controls the keyboard and the mouse of the computer. Whenever the user presses and releases a generic key of the keyboard, the input drive decodes the corresponding signal received from the keyboard into the associated character; this character is then passed to a look-head module 510 (action "A1.Character"). At the same time, the input drive 505 also determines the pressing time of the key, and provides it to an estimator 515 (Action "A2.Time"). Likewise, the input drive 505 decodes the signal received from the mouse indicating the clicking on the backward button or on the forward button; a corresponding request to increase or to decrease the target length, respectively, is passed as well to the estimator 515 (action "A3.Update").

The estimator 515 calculates the target length from the pressing time (dividing the pressing time by the unit of time defining a single characters such as 0.5 s). Moreover, the estimator 515 updates the current target length by subtraction a unit (in response to every decrease request) or by adding a unit (in response to every increase request). In any case, the target length so obtained is then passed to the look-head module 510 (action "A4.Length").

The look-head module 510 accesses a file 520 storing the current vocabulary. The look-head module 510 extracts (from the vocabulary 520) the eligible words corresponding to the prefix—defined by the characters received from the input drive 505—and to the target length—received from the estimator 515 (action "A5.Eligible words"). This operation is performed according to the algorithms described above (with or without the addition of the mute letter "H") before the prefix).

In the embodiment of the invention illustrated in FIGS. 2a-2d, the look-head module 510 supplies the current eligible words to an output module 525 in response to the typing of each character (action "A6.Auto-complete"); preferably, this operation is performed after the prefix has reached a minimum significant length, such as 2-3 characters. The output module 525 controls the monitor to display the pop-up window listing the received eligible words. The input drive 505 is then used to select the desired eligible word for completing the prefix (action "A7.Select"). Alternatively, in the embodiment of the invention illustrated in FIGS. 3a-3c, the look-head module 510 supplies the single eligible word to the output module 525 as soon as any ambiguity has been resolved (same action "A6.Auto-complete), in this case, the prefix is automatically completed into this eligible word.

Figure 6A:
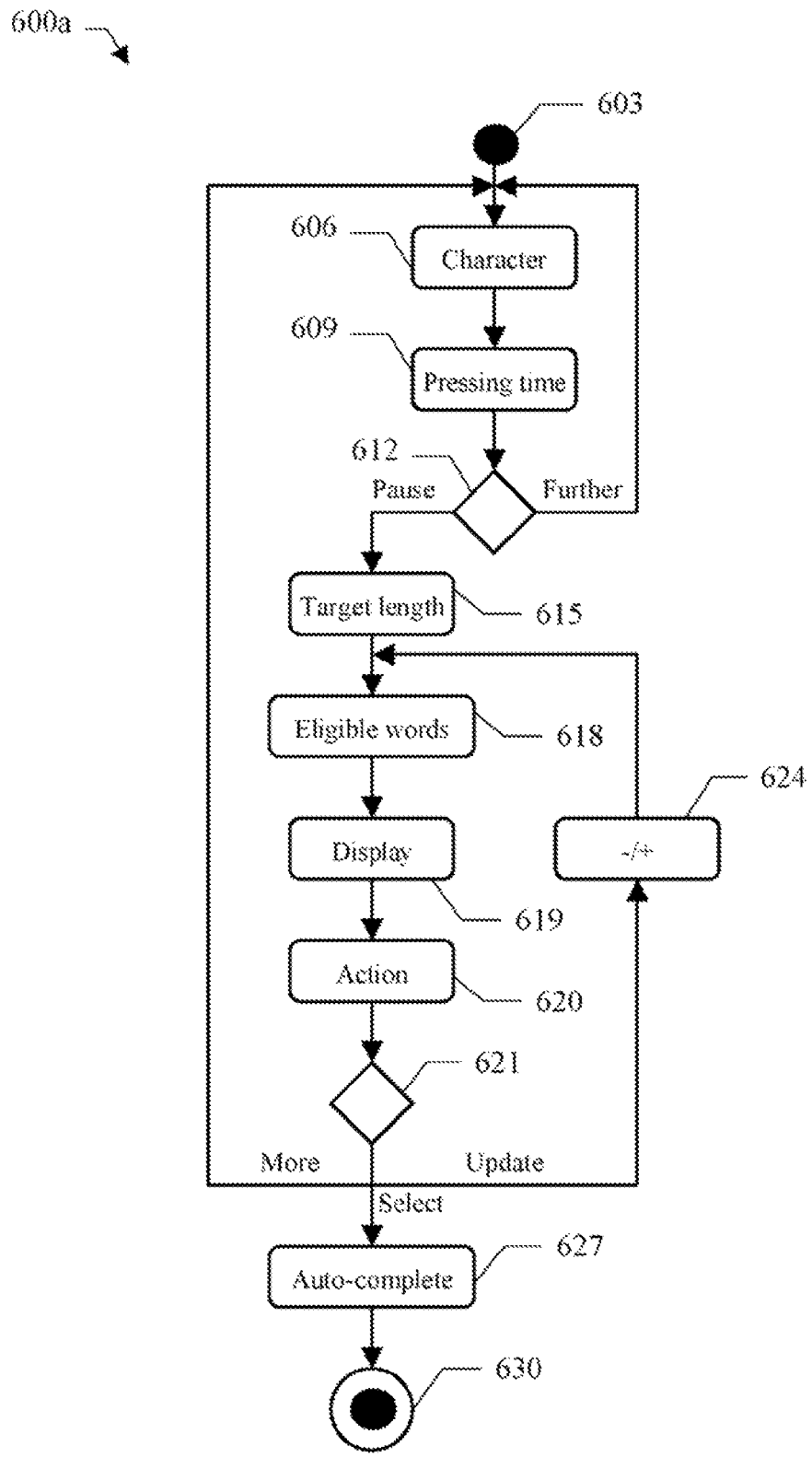
FIGS. 6a and 6b show diagrams describing the flow of activities relating to implementations of the solution according to different embodiments of the invention.

Considering now FIG. 6a, the logic flow of an exemplary process that can be implemented to input a word (using the auto-complete facility of the embodiment of the invention illustrated in FIGS. 2a-2d) is represented with a method 600a.

The method 600a begins at the black start circle 603. Passing to block 606, a character of the target word is typed. The pressing time of the corresponding key is measured at block 609. The auto-complete facility then monitors a time elapsed from a last action of the user, with the flow of activity that branches accordingly at block 612. Particularly, if the user types a further character before the expiration of a predefined time-out (such as 1-2 s), the process returns to block 606 to reiterate the same operations described above. Conversely, as soon as the user pauses for more than this time-out (indicating that s/he is asking for assistance by the auto-complete facility), the process descends into block 615.

In this phase, the target length is calculated (from the pressing time). Proceeding to block 618, the eligible words corresponding to the prefix and the target length are extracted from the vocabulary (according to the desired algorithm). The list of these eligible words is then displayed at block 619 (in the pop-up window associated with the input box). The flow of activity now branches according to the action performed by the user at block 620.

Particularly, if the user decides to type a further character of the target word (for example, because the eligible words art still too many for their selection) the method returns to block 606 to repeat the same operations described above. On the other hand, if the user clicks on the backward button or on the forward button, the target length is updated accordingly at block 624 (by increasing or decreasing it by a unit, respectively). The process then returns to block 618 to process the same prefix according to the updated target length. At the end, if the user selects one of the eligible words the prefix is automatically completed into this eligible word at block 627. The method then ends at the concentric white/block stop circles 630.

Figure 3C:
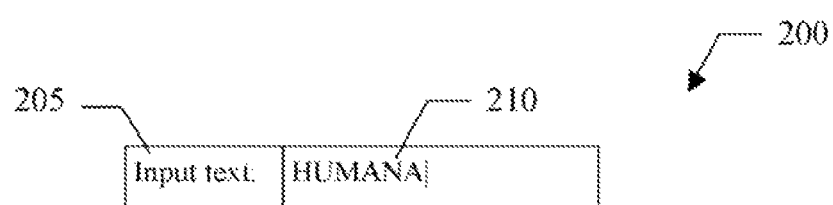
Figure 6B:
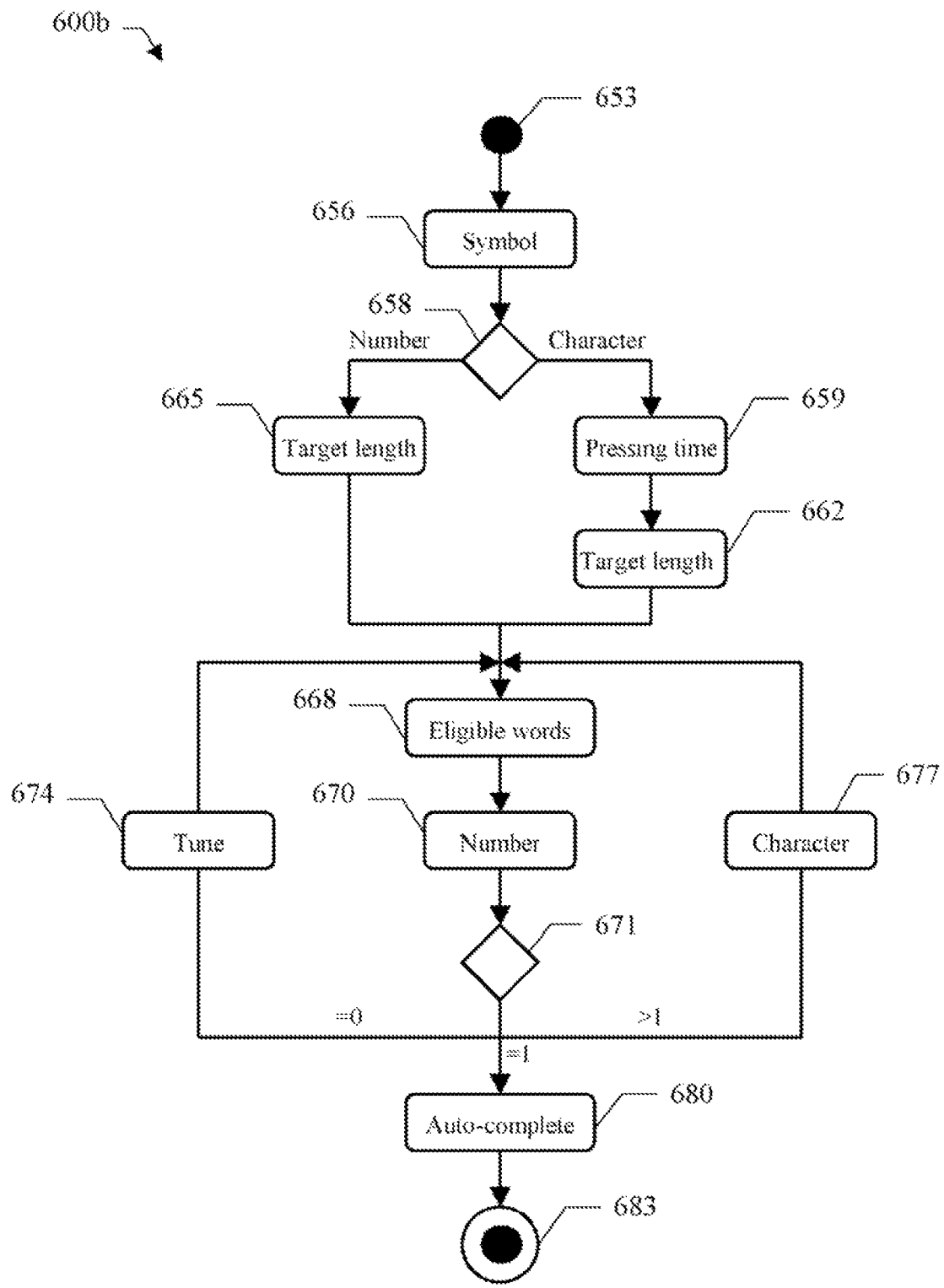

On the other hand, the logic flow of an exemplary process that can be implemented to input a word (using the auto-complete facility of the embodiment of the Invention illustrated in FIGS. 3a-3c) is instead represented in FIG. 6b with a method 600b.

The method 600b begins at the black start circle 653. A symbol (consisting of either the first character of the target word or a number indicating its target length) in typed at block 656. The flow of activity then branches at block 658 according to the typed symbol. Particularly, when the symbol consists of a character the pressing time of the corresponding key is determined at block 659. Passing to block 662, the target length is calculated from this pressing time. Conversely, when the symbol consists of a number the target length is set accordingly at block 665.

In both cases, the flow of activity merges again at block 668, wherein the eligible words corresponding to the prefix and the target length are extracted from the vocabulary as above. The number of these eligible words is then calculated at block 670. The flow of activity branches again at block 671 accordingly. Particularly, when the number of the eligible words is 0, the target length is tuned at block 674 in an attempt to allow the auto-complete facility to provide useful information (for example, by enlarging it into a range centered around the current value). The method then returns to block 668 to process the same prefix according to the updated target length. On the other hand, if the number of eligible words is higher than 1, a further character of the target word is input at block 677 (for resolving the ambiguity); in this case as well, the method returns to block 668 to process the new prefix according to the same target length. At the end, if the number of the eligible words is equal to 1, the prefix is automatically completed into the single eligible word so obtained at block 680. The method then ends at the concentric white/block stop circles 683.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computer has another structure or includes similar elements (such as cache memories temporarily storing the programs or parts thereof to reduce the accesses to the mass memory during execution); in any case, it is possible to replace the computer with any code execution entity (such as a PDA, a mobile phone, and the like). Moreover, the proposed solution lends itself to be implemented in a network of computers, or more generally in whatever data processing system. Likewise, any other user interface—for example, of the command line (or CLI) type—may be used to put the proposed solution into practice.

Even though in the preceding description reference has been made to words and characters, this is not to be interpreted in a limitative manner. For example, similar considerations apply to numbers, or any other symbols; likewise, the symbols may be combined into idioms, expressions, phrases, or more generally any other strings (such as web or e-mail addresses).

Alternatively, it is possible to input whatever indication of the target length (such as the number of characters required to complete the target word instead of its whole length).

In addition, the term vocabulary as used herein refers to any structure providing known strings; for example, the vocabulary can consist of a simple list of words already used, of rules for generating valid addresses, and the like.

It is also possible to determine the eligible words with alternative algorithms (in any case based on the prefix and the target length). For example, the search may be extended to all the words including the prefix (in any position), to words having a slightly shorter and/or longer length (to take into account any inaccuracy of the target length).

Nothing prevents using different input units to provide the prefix and/or the target length (such as a keypad of a mobile telephone, a touch-screen of a PDA, and the like).

In any case, the target length can be defined by an equivalent selection time of one or more of the characters of the prefix (for example, according to the sum of their pressing times).

Alternatively, it is possible to determine the target length by assigning a different unit of time to each character. In any case, nothing prevents inputting the target length with another technique (for example, by typing a specific key or clicking with the mouse once per each character of the target word).

Similar considerations apply if only part of the eligible words is displayed in the pop-up window, or in any other equivalent structure (such as limiting the display to the eligible words used most frequently, preferably ordered accordingly). In any case, it is also possible to display the pop-up window with the eligible words continuously (in response to the typing of every character).

The use of one or more equivalent commands for increasing and/or decreasing the target length falls within the scope of the invention (for example, implemented by the left button and the right button, respectively, of the mouse); in any case, this feature is not strictly necessary.

Alternatively, nothing prevents requesting an explicit confirmation to the user before auto-completing the prefix in any case (even when a single eligible word has been found).

The possibility of adding two or more characters before the prefix (for searching the eligible words in the vocabulary) is not excluded; likewise, it is possible to take into account different mute characters (according to the specific language), or more generally any other combination of one or more predefined characters. It should be readily apparent that the search of the eligible words may also include a more complex auto-correction feature (for example, recognizing any exchange of two adjacent characters). However, this additional feature is not essential, and it may be omitted is some embodiments of the invention.

It would be readily apparent that the proposed solution may be implemented at the level of an operating system of the computer, or directly by any application program running thereon (such as a word-processor, an SMS editor, a web browser, an e-mail client, a code editor, and the like). However, the same technique may also be deployed as a service that is downloaded on the computer, or that is accessed through a network (such the Internet).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (by using similar steps, removing some steps being not essential, or adding further optional steps—even in a different order). In any case, the program may take any form suitable to be used by or in connection with any data processing system, such as external or resident software, firmware, or microcode (either in object code or in source code). Moreover, it is possible to provide the program on any computer-usable medium; the medium can be any element suitable to contain, store, or transfer the program. For example, the medium may be of the electronic, magnetic, optical, electromagnetic, infrared, or semiconductor type; examples of such medium are fixed disks (where the program can be pre-loaded), removable disks, tapes, cards, and the like.

In any case, the solution according to the present invention lends itself to be carried out with a hardware structure (for example, integrated in a chip of semiconductor material), or with a combination of software and hardware.

The invention claimed is:

1. A method, comprising:
 receiving a sub-sequence of a sequence of symbols of a target string;
 detecting, via a user input device, a user indication of a target length of the target string comprising:
  detecting entry of a number via the user input device followed by a single letter; and
  assigning the entered number as the target length;
 associating, in response to detecting the user indication of the target length of the target string via the user input device, a set of eligible strings of a predefined vocabulary with the sub-sequence comprising selecting strings of the predefined vocabulary that begin with the single letter and comprise the assigned target length as the set of eligible strings, each eligible string comprising the sub-sequence and comprising a length corresponding to the user indication of the target length; and
 enabling user selection of one of the eligible strings via the user input device as the target string.

2. The method according to claim 1, where detecting, via a user input device, a user indication of a target length of the target string comprises:
 measuring a selection time via the user input device of at least one of the symbols of the sub-sequence; and
 setting the target length as the measured selection time of the at least one of the symbols of the sub-sequence.

3. The method according to claim 2, where the user input device comprises a keyboard and measuring a selection time via the user input device of at least one of the symbols of the sub-sequence comprises:
 measuring an activation time of a key of the keyboard corresponding to the at least one of the symbols of the sub-sequence, the selection time comprising the measured activation time of the key.

4. The method according to claim 2, where setting the target length as the measured selection time of the at least one of the symbols of the sub-sequence comprises:
 setting the target length as the measured selection time of a last symbol of the subsequence; and
 where enabling user selection of one of the eligible strings via the user input device as the target string comprises:
  displaying the eligible strings;
  prompting the user to select one of the eligible strings;
  detecting a selection of an eligible string; and
  completing the sub-sequence automatically in response to detecting the selection of the eligible string.

5. The method according to claim 4, further comprising:
 detecting a selection via the user input device of a user interface button indicating a change of the target length of the target string; and
 updating the target length based upon the indicated change of the target length of the target string.

6. The method according to claim 2, where setting the target length as the measured selection time of the at least one of the symbols of the sub-sequence comprises:
 setting the target length as the measured selection time of a first symbol of the sub-sequence; and
 where enabling user selection of one of the eligible strings via the user input device as the target string comprises:
  in response to the eligible strings consisting of a single eligible string, completing the sub-sequence automatically into the single eligible string.

7. The method according to claim 1, where associating, in response to detecting the user indication of the target length of the target string via the user input device, a set of eligible strings of a predefined vocabulary with the sub-sequence comprises:
 extracting strings of a vocabulary starting with the sub-sequence and comprising the target length.

8. The method according to claim 7, where extracting strings of a vocabulary starting with the sub-sequence and comprising the target length comprises:
 extracting the strings of the vocabulary comprising the sub-sequence after a prefix, comprising any combination of a set of preceding symbols with a predetermined prefix length, and comprising the target length plus the prefix length.

9. The method according to claim 8, where the prefix length is one and the preceding symbols comprise each mute character of a predefined alphabet.

10. A non-transitory computer-usable storage medium embodying computer program code comprising computer executable instructions configured, when executed by a computer, for:
receiving a sub-sequence of a sequence of symbols of a target string;
detecting, via a user input device, a user indication of a target length of the target string comprising:
detecting entry of a number via the user input device followed by a single letter; and
assigning the entered number as the target length;
associating, in response to detecting the user indication of the target length of the target string via the user input device, a set of eligible strings of a predefined vocabulary with the sub-sequence comprising selecting strings of the predefined vocabulary that begin with the single letter and comprise the assigned target length as the set of eligible strings, each eligible string comprising the sub-sequence and comprising a length corresponding to the user indication of the target length; and
enabling user selection of one of the eligible strings via the user input device as the target string.

11. The non-transitory computer-usable storage medium of claim 10, where the embodied computer program code configured, when executed by a computer, for detecting, via a user input device, a user indication of a target length of the target string comprises computer executable instructions configured, when executed by the computer, for:
measuring a selection time via the user input device of at least one of the symbols of the sub-sequence; and
setting the target length as the measured selection time of at least one of the symbols of the sub-sequence.

12. The non-transitory computer-usable storage medium of claim 11, where the user input device comprises a keyboard and the embodied computer program code configured, when executed by the computer, for measuring a selection time via the user input device of at least one of the symbols of the sub-sequence comprises computer executable instructions configured, when executed by the computer, for:
measuring an activation time of a key of a keyboard corresponding to the at least one of the symbols of the sub-sequence, the selection time comprising the measured activation time of the key.

13. The non-transitory computer-usable storage medium of claim 11, where the embodied computer program code configured, when executed by the computer, for setting the target length as the measured selection time of the at least one of the symbols of the sub-sequence comprises computer executable instructions configured, when executed by the computer, for:
setting the target length as to the measured selection time of a last symbol of the sequence; and
where the computer program code configured, when executed by the computer, for enabling user selection of one of the eligible strings via the user input device as the target string comprises computer program code configured, when executed by the computer, for:
displaying the eligible strings;
prompting the user to select one of the eligible strings;
detecting a selection of an eligible string; and
completing the sub-sequence automatically in response to detecting the selection of the eligible string.

14. The non-transitory computer-usable storage medium of claim 13, where the embodied computer program code further comprises computer executable instructions configured, when executed by the computer, for:
detecting a selection via the user input device of a user interface button indicating a change of the target length of the target string; and
updating the target length based upon the indicated change of the target length of the target string.

15. The non-transitory computer-usable storage medium of claim 11, where the embodied computer program code configured, when executed by the computer, for setting the target length as the measured selection time of the at least one of the symbols of the sub-sequence comprises computer executable instructions configured, when executed by the computer, for:
setting the target length as the measured selection time of a first symbol of the sub-sequence; and
where the computer program code configured, when executed by the computer, for enabling user selection of one of the eligible strings via the user input device as the target string comprises computer program code configured, when executed by the computer, for:
in response to the eligible strings consisting of a single eligible string, completing the sub-sequence automatically into the single eligible string.

16. The non-transitory computer-usable storage medium of claim 10, where the embodied computer program code configured, when executed by the computer, for associating, in response to detecting the user indication of the target length of the target string via the user input device, a set of eligible strings of a predefined vocabulary with the sub-sequence comprises computer program code configured, when executed by the computer, for:
extracting strings of a vocabulary starting with the sub-sequence and comprising the target length.

17. The non-transitory computer-usable storage medium of claim 16, where the embodied computer program code configured, when executed by the computer, for extracting strings of a vocabulary starting with the sub-sequence and comprising the target length comprises computer program code configured, when executed by the computer, for:
extracting the strings of the vocabulary comprising the sub-sequence after a prefix, comprising any combination of a set of preceding symbols with a predetermined prefix length, and comprising the target length plus the prefix length.

18. The non-transitory computer-usable storage medium of claim 17, where the prefix length is one, and the preceding symbols comprise each mute character of a predefined alphabet.

* * * * *